Figure 1:
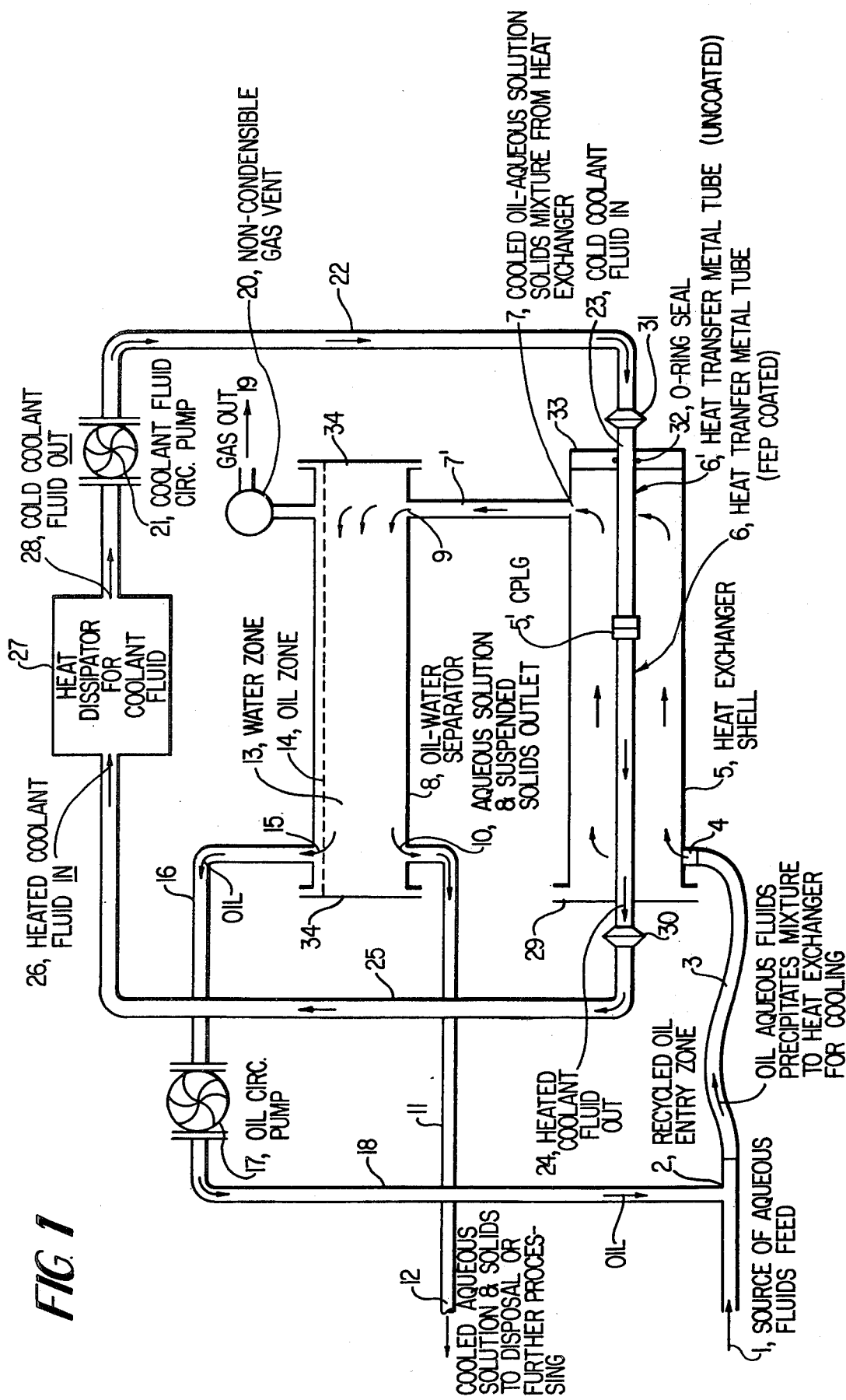

United States Patent [19]

Erwin

[11] 4,127,164
[45] Nov. 28, 1978

[54] HEAT EXCHANGE APPARATUS

[75] Inventor: Ransome W. Erwin, Santa Fe, N. Mex.

[73] Assignee: Austral-Erwin Engineering Co., Houston, Tex.

[21] Appl. No.: 654,848

[22] Filed: Feb. 3, 1976

Related U.S. Application Data

[60] Division of Ser. No. 588,797, Jun. 20, 1975, Pat. No. 4,082,140, which is a continuation-in-part of Ser. No. 306,183, Nov. 14, 1972, Pat. No. 3,891,496, and Ser. No. 581,849, May 29, 1975, which is a division of Ser. No. 306,183.

[51] Int. Cl.$^2$ ............................................. F28F 19/02
[52] U.S. Cl. ..................................... 165/133; 165/45; 165/134 R
[58] Field of Search ................... 165/154, 133, 45, 133, 165/1, 134; 159/28 R

[56] References Cited

U.S. PATENT DOCUMENTS

| | | | |
|---|---|---|---|
| 2,076,903 | 4/1937 | Levitt | 165/154 |
| 2,499,608 | 3/1950 | Rink | 165/142 |
| 2,714,139 | 7/1955 | Yula | 165/142 |
| 2,880,018 | 3/1959 | Robinson | 165/133 |
| 3,001,767 | 9/1961 | Straubing | 165/154 |
| 3,050,786 | 8/1962 | St. John | 159/28 R |
| 3,289,753 | 12/1966 | Erb | 159/28 R |
| 3,301,314 | 1/1967 | Gaertner | 159/28 R |
| 3,400,754 | 9/1968 | Barbu et al. | 165/1 |
| 3,489,209 | 1/1970 | Johnson | 159/28 R |
| 3,534,555 | 10/1970 | Webb | 159/28 R |
| 3,612,174 | 10/1971 | Schaan | 165/154 |
| 3,613,779 | 10/1971 | Brown | 165/133 |
| 3,630,276 | 12/1971 | Paine | 165/133 |
| 3,705,057 | 12/1972 | Kelp | 165/133 |

Primary Examiner—Charles J. Myhre
Assistant Examiner—Margaret LaTulip

[57] ABSTRACT

Heat exchange takes place between two fluids, namely, mineralized aqueous fluid containing dissolved or dispersed solids or mineral salts and a second fluid, in heat exchange apparatus wherein the surfaces to be contacted by the mineralized aqueous fluid are (1) preferentially oil wettable and (2) substantially zero water adsorbent and (3) are continuously wetted with an organic liquid (oil) which is not permanently miscible with the aqueous fluid being treated, whereby adherence of solids or mineral salts contained in the aqueous fluid or solution is prevented. The preferentially oil wettable and substantially zero water adsorbent contacted surfaces are preferably fluorocarbon polymers such as FEP, however, parylene surfaces are effective and substantially zero water adsorbent but are not as satisfactory as fluorocarbon polymers since parylene coatings on metal are not as permanent as FEP coatings and tend to blister under certain conditions.

The apparatus and method herein described are suitable for use in the treatment of hot geothermal fluids as well as for evaporating brines.

8 Claims, 2 Drawing Figures

HEAT EXCHANGE APPARATUS

RELATED APPLICATIONS

This application is a division of my application, Ser. No. 588,797, now U.S. Pat. No. 4,082,140, filed June 20, 1975, which is a continuation-in-part of my application Ser. No. 306,183, filed Nov. 14, 1972, entitled "Improvements in Heat Exchangers and Evaporator", now U.S. Pat. No. 3,891,496 dated June 24, 1975, and of my application Ser. No. 581,849, filed May 29, 1975 which is a division of Ser. No. 306,183. It is also related to my application Ser. No. 401,655, same title, filed Sept 28, 1973, now U.S. Pat. No. 3,925,149 dated Dec. 9, 1975, and to application Ser. No. 409,659, same title, filed Oct. 25, 1975, now U.S. Pat. No. 3,939,036, dated Feb. 17, 1976, both continuations-in-part of Ser. No. 306,183. The entire disclosures of the above applications and patents are hereby incorporated by reference as part of the disclosure of the present application.

BRIEF DESCRIPTION OF THE INVENTION

Heat exchange takes place between two fluids, namely, mineralized aqueous fluid containing dissolved or dispersed solids or mineral salts and a second fluid, in heat exchange apparatus wherein the surfaces to be contacted by the mineralized aqueous fluid are preferentially oil wettable and substantially zero water adsorbent and are continuously wetted with an organic liquid (oil) which is not permanently miscible with the aqueous fluid being treated, whereby adherence of solids or mineral salts contained in aqueous fluid or solution is prevented. The preferentially oil wettable and substantially zero water adsorbent contacted surfaces are preferable fluorocarbon polymers such as FEP, however, parylene surfaces are effective and substantially zero water adsorbent but art not as satisfactory as fluorocarbon polymers since parylene coatings on metal are not as permanent as FEP coatings and tend to blister under certain conditions.

The apparatus and method herein described are suitable for use in the treatment of hot geothermal fluids as well as for evaporation brines as set forth in my U.S. Pat. No. 3,891,496, dated June 24, 1975 granted on Ser. No. 306,183, filed Nov. 14, 1972, of which the present application is a continuation-in-part.

While the present disclosure relates primarily to the cooling of hot fluids such as geothermal brines, the invention in its broadest aspects may be applied to various heat exchange products, wherein heat exchange takes place between fluids, one or both of which contain precipitable solids, which tend to adhere to the contacting heat exchange surfaces and cause clogging of the apparatus. Such adherence is prevented in accordance with the present invention by the use of preferentially oil wettable contact surfaces which are also substantially zero water adsorbent such as FEP or parylene.

Where hot fluids such as geothermal brines are being cooled, the heat extracted may be used for commercial purposes, such as the production of vapor for operating turbines and the like or for chemical processes requiring the use of heat.

The precipitated solids may comprise useful products which may be separated from the fluid or fluids and used commercially and the fluids themselves may be useful products which can also be used commercially. In the case of water, this, when sufficiently purified, may be used for irrigation purposes or even for drinking, or in some cases may be returned underground to maintain adequate pressure and water levels.

BACKGROUND OF THE INVENTION

The claims of the above applications and patents are concerned, primarily, with solids adherence problems related to the heating and evaporating of aqueous solutions wherein minerals are precipitated and form scale on contacting surfaces. Such adherence problems, as taught by the above applications and patents, are eliminated by use of oil films on preferentially oil wettable surfaces that are substantially zero water adsorbent such as provided by the fluorocarbon polymers. The research pertaining to the above four applications, while directed generally to heat exchange, concerned itself primarily with heating and evaporating mineralized aqueous solutions. Since that time I have more specifically directed my research to the extraction of heat from geothermal fluids by cooling with a circulating coolant and have found the problem and its solution to be similar to those involved in the heating and evaporating systems, with some important exceptions. In both situations oil films on substantially zero water adsorbent surfaces are required to prevent adherence of solids, and fluorocarbon polymers, particularly FEP, appear to be the most suitable materials for this purpose. I have also tested parylene materials, specifically Union Carbide's Parylene-N and Parylene-C which, too, are substantially zero water adsorbent and do not scale up, but which also do not stay well bonded to the metal surfaces, especially in systems where steam vapor is being condensed. FEP films heat bonded to metal surfaces, in contrast to heating and evaporation systems, will not stay bonded, but tend to form water blisters of pure water beneath the film, pulling the film from the metal surface in systems where water vapor is being condensed, whereas in heating and evaporating systems such FEP films, heat bonded to the metal, remained perfectly intact after many hours of exposure. The only heat bondable fluorocarbon polymer material I have found suitable for condensing steam systems, and one that appears to remain bonded indefinitely, is FEP applied, not as a film, but as a dispersion from a distilled water dispersion or applied as a finely divided particle coating, by static charge dry spraying, then heat bonded to the surface in a conventional oven. Such FEP dispersions are known in the art and a suitable dispersion is known as DuPont FEP dispersion. My explanation of this unusual phenomenon is simply that the dispersion appears to be bonded as individual particles, not actually forming a continuous film and is therefore more porous, permitting steam to penetrate to the condensing metal surface, form water and ooze back through the pores of the FEP coating, whereas with bonded FEP film, the steam penetrates through the smaller pores to the metal well, condenses, but cannot return through the smaller pores, thereby pushing the continuous film from the metal surface to which it was originally heat bonded. This becomes vital to heat exchange systems as disclosed in this application, as the FEP dispersion is the only material I have found thus far to provide a relatively permanently heat bonded, substantially zero water adsorbent fluorocarbon polymer for prevention of solids adherence when coated with an oil film, when cooling or condensing water vapor as distinguished from evaporating processes. In my work with cooling geothermal brines in the Imperial Valley of California, I found that all of the interiors of the cooling heat exchanger should be coated with such a substantially zero water adsorbent coating, including both the heat transfer tube itself and the interior of the heat exchanger shell. I ran tests using FEP coated heat transfer tubes, but with epoxy coating on the shell interior, as set forth in my U.S. Pat. No. 2,903,243 dated Sept. 8, 1959, Col. 3, line 5, in claim 3 of said patent finding that the FEP coated tube did not scale, but that the epoxy coating scaled immediately, soon having lost its ability to stay wet with oil because it is water adsorbable and soon becomes water wettable. Many technical experts have seen my test system, and admit to its beneficial effects and readily agree that it may well prove to be the most practical solution to the nearly impossible scaling condition involved with cooling and extraction of useful energy from geothermal fluids.

In the present specification and claims reference is made to an "immiscible liquid" or "oil", which is temporarily intimately mixed or dispersed, as by agitation, pressure or the like with an aqueous solution to be heated to remove impurities therefrom. Such immiscible liquid or oil while preferably a hydrocarbon need not necessarily be true hydrocarbon but may be aqueous liquid containing impurities to be removed. The particular immiscible liquid or oil to be employed depends on the aqueous liquid to be treated though there may be wide variations dependent on the availability of the liquid and the particular conditions under which the process is to be carried out. For example in treating brine, I have found mineral oils such as automobile lubricating oils, turbine oils and the like to be particularly satisfactory and these have actually been used in the process herein described. The turbine oils have been found to be stable and not readily oxidizable on heating. For refining vegetable materials such as beet sugar solutions or the like a non-toxic mineral or vegetable oil may be used. Where a high degree of heat stability is required a heat resistant oil such as silicone fluids or silanes may be employed and are contemplated as intended to be included under the terms "immiscible liquid" and "oil" as used in the present specification and claims, as set forth in my U.S. Pat. No. 3,891,496, Col. 14, beginning line 12.

The "oil" or "immiscible liquid" should be of different specific gravity and of higher boiling point than the aqueous solution with which it is to be temporarily mixed. Mineral oils, vegetable oils, silicone fluids and silanes are well known products and are defined for example in Reinhold's *The Condensed Chemical Dictionary*, 6th *Edition*.

It will be understood that by the term "immiscible" as used in the present specification and claims a permanent mixture is referred to since the immiscible liquid or oil on the one hand and the aqueous solution on the other hand cannot be permanently mixed but one may be temporarily mixed or dispersed in the other as the aid of pressure, agitation or the like and such temporary mixture or dispersion may thereafter be separated by suitable means as is well known in the art.

OBJECTS OF THE INVENTION

Among the objects of this invention are the provision of a method and apparatus to:

1. Exchange heat between two fluid systems through a continuously oil wetted wall, the surface of which is substantially zero water adsorbent, thereby preventing deposition of solids on said surface, wherein the *hotter fluid* being cooled and, possibly, condensed from a gas to a liquid, if gaseous, may consist of;

(a) A mixture of aqueous solution and oil;

(b) A mixture of aqueous solution, suspended solids, and oil;

(c) A mixture of aqueous solution, entrained vapors, and oil;

(d) A mixture of aqueous solution, suspended solids, vapor, and oil;

(e) A mixture of aqueous solution, entrained vapor, some or all of which may consist of water vapor, suspended solids, and oil;

(f) Any fluid, solids free, which forms no solids when subjected to cooling, and wherein the cooler fluid is on the other side of said heat exchange wall, said fluid being heated by flow of heat from the hotter fluid through said wall, may consist of:

(a′) Any fluid that forms no solids when subjected to heating, and which contains no entrained solids;

(b′) A mixture of any fluid with oil, wherein said fluid is subject to forming precipitated solids when heated;

(c′) A mixture of any fluid and entrained solids, and oil, and wherein either or both sides of the heat transfer wall separating the hot fluid from the cold fluid may have a surface which is substantially zero water adsorbent, always providing such a surface for contacting fluids subject to solids formation on contacting surfaces, and always providing oil with said fluid for forming oil films on said substantially zero water adsorbent surface to prevent adherence of solids from such fluids.

2. A further object of this invention is the provision of metallic walls for piping and vessels which confine or conduct mineralized aqueous fluids which are to be cooled and condensed, if in a vapor state, by transfer of heat from the fluid through the metallic wall, whereby said metallic walls are thoroughly coated with a firmly bonded layer of substantially zero water adsorbent material which does not blister or become unbonded when contacted with condensing water vapors or water in a state of temperature reduction, and wherein an immiscible organic fluid or liquid such as a petroleum or vegetable hydrocarbon oil or a silicone oil or silane is premixed with the aqueous fluid to provide a film or coating on the metallic wall for the prevention of adherence of solids from the aqueous fluid. One such material for this coating discovered by this inventor is baked-on heat bondable DuPont FEP fluorocarbon polymer applied only as a dispersion in a liquid vehicle such as distilled water (prior to heat bonding in a suitable oven) or as a finely divided dry powder employing recently known and developed techniques of static charge spraying. This is the only heat bondable fluorocarbon polymer found thus far that will withstand blistering when contacted with condensing water vapors, it being found that heat bonded FEP applied as a pliable film, prior to heat bonding, blistered and lost its bond in two or three hours or less times of exposure to conditions of condensing steam.

A parylene coating has also been found to be substantially zero water adsorbent, but is not as durable as FEP and is subject to blistering after a period of time.

3. A further object of this invention is to recover and recycle the oils employed for film forming with minimum losses in economically tolerant ranges, recovering it from the mineralized aqueous fluids being cooled or condensed.

4. A further object is provision of horizontal vessels and heat exchange tubing wherein sufficient velocity of the moving fluids is provided to maintain turbulent flow, dispersion of the film-forming oil throughout the fluid, thereby assuring adequate contact of oil with all substantially zero water adsorbent contacting surfaces in the system.

Figure 2:
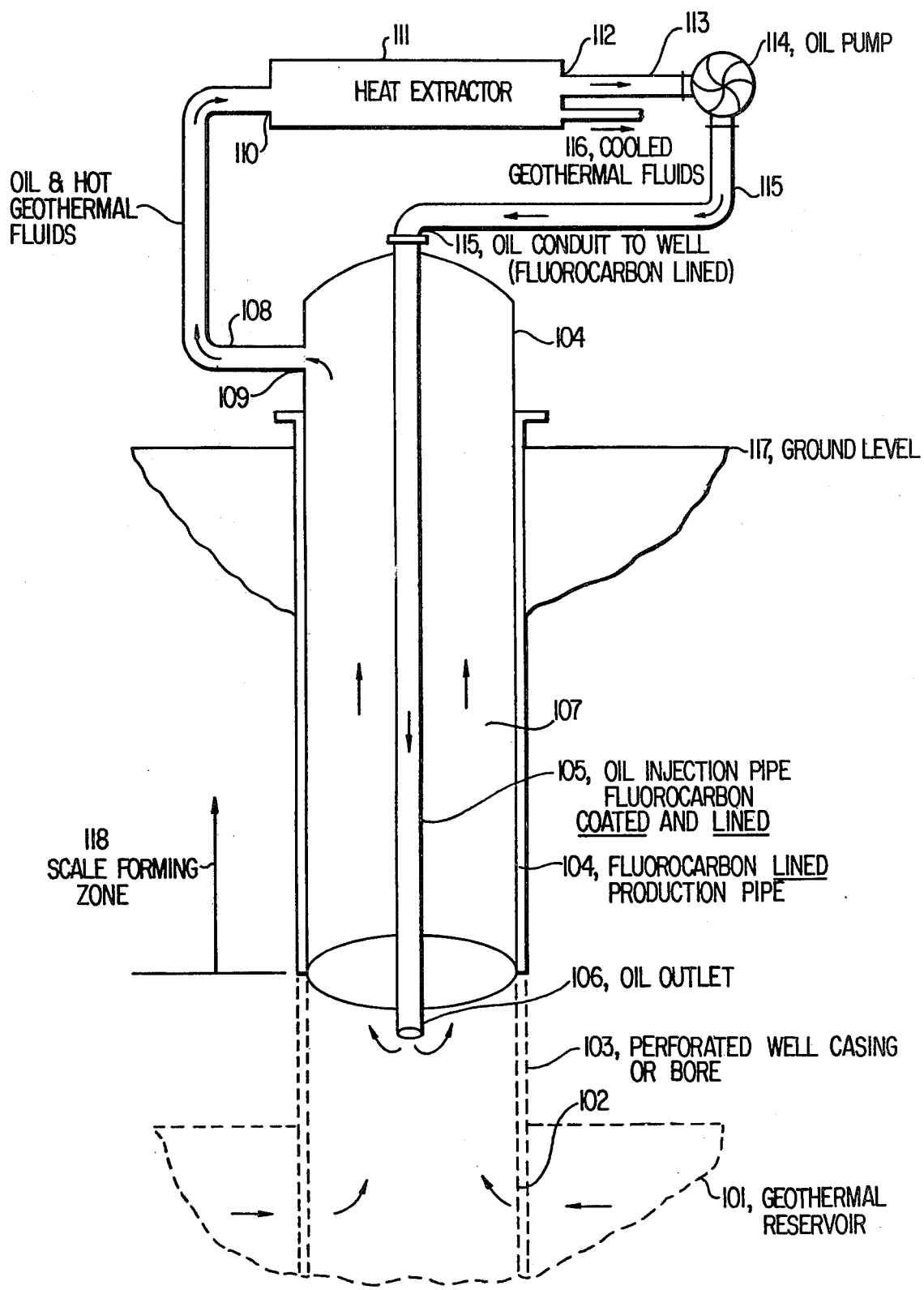

5. A further object of this invention is to extract heat from hot, mineralized aqueous fluids such as geothermal fuids, wherein such fluids may contain entrained solids or produce such when cooled to lower temperatures, without adherence of solids to the contacting surfaces of the system, consisting of conduit piping, containing vessels and heat transfer walls, wherein such surfaces are substantially zero water adsorbent and preferentially oil wettable in presence of water, and wherein oil is previously mixed with said fluids to provide a continuous oil film on said contacting and heat transfer surfaces. In contrast to the horizontal vessels and tubing of 4,(supra), the piping and vessels or shells may be upright or vertical as shown in FIG. 2 of the drawings or may be intermediate the horizontal and vertical positions.

6. A further object of this invention is the prevention of solids adherence to contacting surfaces of conduits and vessels containing flowing, previously heated, mineralized aqueous fluids which form precipitated mineral solids as they are progressively expanded and cooled, such prevention consisting of injection of immiscible, organic fluid or oil (such as petroleum or vegetable hydrocarbons or even silicone fluids or silanes) into mineralized aqueous fluid prior to expanding and cooling, and the provision of substantially zero water adsorbent contacting surfaces in all zones where solids adherence might occur.

7. A further object of this invention is a system to utilize the combination of film-forming oil and substantially zero water adsorbent surfaces in geothermal wells for prevention of solids adherence to the well casing as the hot fluids flow upward from the earth reservoir, are partially flashed from liquid to steam, thereby being reduced in temperature, producing precipitates as a residue from the portion evaporated or flashed to steam.

8. A further object of this invention is the provision, in horizontal flowing systems of vessels and piping, of sufficient flow velocity to prevent sedimentation of suspended solids in the moving aqueous fluids, employing film-forming oil and substantially zero water adsorbent contacting surfaces for prevention of solids adherence.

ADVANTAGES OF THE INVENTION

The present invention
1. Provides continuous operation of heat exchangers for mineralized aqueous fluids at maximum efficiency, without downtime for cleaning or use of expensive chemical additives for prevention of scale or solids adherence, and in some instances, this may actually mean the difference between a system that will operate and one that will not operate at all.
2. Permits economical utilization of geothermal reservoirs, such as those in the Imperial Valley of California, without stoppage of the producing wells due to mineral scaling, and makes it possible to utilize some of the worst scale producing wells that up to now have presented unsolved problems in utilization because of almost immediate fouling and stoppage of heat transfer equipment for extraction of useful heat from such fluids.

While the process of the present disclosure relates primarily to the cooling of hot fluids such as geothermal brines, the apparatus in its broadest aspects may be applied to various heat exchange products, wherein heat exchange takes place between fluids, one or both of which contain precipitable solids, which tend to adhere to the contacting heat exchange surfaces and cause clogging of the apparatus. Such adherence is prevented in accordance with the present invention by the use of preferentially oil wettable contact surfaces which are also substantially zero RWE adsorbent such as FEP or parylene.

Where hot fluids such as geothermal brines are being cooled, the heat extracted may be used for commercial purposes, such as the production of vapor for operating turbines and the like or for chemical processes requiring the use of heat. Parylene is defined in Reinhold, *The Condensed Chemical Dictionary*, Eighth Edition © 1971, page 660 as follows:

Parylene. Generic name for thermoplastic film polymers based on para-zylylene and made by vaporphase polymerization.

The precipitated solids may comprise useful products which may be separated from the fluid or fluids and used commercially and the fluids themselves may be useful products which can also be used commercially. In the case of water, this when sufficiently purified, may be used for irrigation purposes or even for drinking, or in some cases may be returned underground to maintain adequate pressure and water levels.

DESCRIPTION OF THE INVENTION

The invention will be more readily understood by referring to the accompanying drawings and the following detailed description which are intended as illustrative of the invention rather than as limiting the invention to the specific details herein set forth.

IN THE DRAWINGS

FIG. 1 is a schematic drawing showing one form of the invention wherein horizontal vessels, casings, shells or tubing and inner heat exchange tubing are employed; and FIG. 2 is a view similar to FIG. 1 showing a system particularly intended as adapted for use in connection with geothermal wells and the like, and employing an upright outer shell, casing or tubing and an inner heat exchange tubing similar in many respects to what is shown in my application, Ser. No. 306,183, filed Nov. 14, 1972 and in divisional application, Ser. No. 581,849, filed May 29, 1975.

The embodiment of FIG. 1 will be described first:

FIG. 1: Separate flow paths for the hot aqueous fluid-oil mixture and for the circulating coolant fluid are described as follows:

A. Hot aqueous fluid-oil mixture: Any type of aqueous fluids containing dissolved solids only, or both dissolved and entrained solids, with or without entrained water vapor, subject to precipitation of solids when cooled and/or expanded to a lower pressure, is suitable for this method of handling, without formation of scale on contacting surfaces. This aqueous fluid feed from source 1 is mixed with oil at oil entry zone 2, conveyed through fluorocarbon polymer lined feed conduit 3 to enter the outer heat exchanger shell 5 at inlet 4. The conduit 3 is fluorocarbon lined to prevent adherence of solid which form as the aqueous fluid loses temperature. The oil-aqueous fluid mixture flows in turbulent flow (to maintain dispersion of the oil throughout the aqueous fluid) through the annular space between the outer shell 5 and the inner fluorocarbon resin coated heat transfer tube 6. The tube 6 may be made of more than one tube joined together by coupling 5',(for sake of testing and comparing). The tube 6 was coated preferably both internally and externally with fluorocarbon resin and tube 6' was uncoated whereas in non-experimental operation all tubes are coated with the fluorocarbon resin. The scheme depicted here conclusively proved that such coated tubes do not scale and that uncoated tubes such as 6' do scale up with adhered mineral solids. Both tubes 6 and 6' were subjected to intimate contact with the entrained oil in the mixture as it flowed through the heat exchanger shell 5, the oil wetting tube 6 and preventing solids adherence, but not wetting tube 6' which scaled. Flange lid 29, unions 30 and 31, and O-ring seal 32 are shown as a method to permit easy installation and removal of coupled tubes 6 and 6' for observation after testing. The inner surface of shell 5 is also coated with fluorocarbon resin to prevent adherence of solids formed from expanding and cooling the aqueous fluid. This oil-aqueous fluid-solids mixture transfers a portion of its heat through the wall of FEP cooled tube 6 to the circulating coolant fluid inside tube 6, condensing any entrained water vapor. The mixture leaves shell 5 at outlet 7 through conduit 7' to enter oil-water separator 8 at inlet 9. The mixture then flows horizontally through separator 8, the oil gravitating to the top portion of the separator at oil zone 14, flowing along zone 14 to upper outlet 15. The aqueous portion flows along water zone 13 with sufficient velocity, through not turbulent, to prevent sedimentation of solids, leaving with entrained solids at lower outlet 10 from the oil-water separator 8. This cooled watery solution-solids mixture, with most of the oil now removed, flows through conduit 11 to disposal or total oil removing facilities 12 if such are required. All interior surfaces of the separator 8 and conduits 7' and 11 are coated with fluorcarbon resin to prevent adherence of solids. The separated oil, not required to be wholly water-free, leaves the separator 8 at upper outlet 15 through conduit 16 leading to pump 17 which recycles it through conduit 18 to entry zone 2, to repeat its function and cycle. Any non-condensible gases released in the oil-water separator 8 may be removed through automatic gas vent 20, discharging at 19.

B. Coolant Fluid Cycle: The coolant fluid may consist of any fluid required to remove heat from the aqueous fluid. It may be a low boiling point liquid such as iso-butane, currently in use to extract heat from geothermal fluids, producing vapor for turbine generation of electricity. It may be pure water for production of steam for any suitable end use. It may be a portion of the mineralized water to be converted to pure water and minerals. If the coolant fluid is subject to forming solids when heated or evaporated, oil should be mixed with it and all contacting surfaces should be substantially zero water adsorbent to prevent adherence of solids as taught in my patent application Ser. No. 306,183, U.S. Pat. No. 3,891,496 of which this application is a continuation-in-part. Such oil addition is not shown in this disclosure but may be readily supplied. Cooled coolant fluid is circulated by pump 21 through conduit 22 to enter heat transfer tube 6' at 23. It flows through heat transfer tubes 6' and 6, extracting heat through the wall of the tubes from the exterior contacting of the aqueous fluid-oil mixture flowing through shell 5, thereby cooling said mixture as previously described. The heated coolant leaves tube 6 at outlet 24, flows through conduit 25 to enter heat dissipator 27 and inlet 26. Here it is cooled (exact method not shown as common in the art) leaving at outlet 28 to enter pump 21 for recycling. Flange lids 29 and 34 simply provide access to heat exchanger shell 5 and oil-water separator 8. Plate 33 houses 0-ring 32.

Although FIG. 1 depicts a scheme for horizontally disposed apparatus, the method is by no means limited to such, lending itself to any position from horizontal to vertical as would be suggested to those skilled in the art, or as required for a specific operation.

It will be apparent that the amount of heat extraction in the heat dissipator 27 may be very substantial and may be used for various commercial purposes as will be understood by those skilled in the art.

FIG. 2: FIG. 2 depicts a modified system intended primarily for use in connection with a geothermal well, which system utilizes the same general theory and methods involved in the process and apparatus of FIG. 1 which are the substance of this invention, namely to prevent the scaling of casing in a geothermal well from minerals precipitated at the zone where steam breaks from the mineralized water as it is flowed up the hole to a reduced flashing pressure. This level will vary from well to well but can be determined sufficiently to suggest the proper well level at which scale prevention methods should be applied. It is proposed to suspend a length of an outer production pipe, shell or casing 104 in a preforated well casing or bore 103, the casing 104 being internally coated with a fluorocarbon resin and of sufficient length to extend safely below the well level 118 at which precipitates form from flashing of steam and cooling of the aqueous solution. The injected oil to provide film on the substantially zero water adsorbent internal surface of pipe, shell or casing 104 for prevention of solids adherence is provided through a smaller inner suspended pipe 105 which is coated internally and externally with fluorocarbon resin to prevent adherence of solids both inside and outside.

The flow scheme is as follows: Geothermal reservoir 101 flows geothermal fluids into the well bore at 102 which fluids flow upwardly to scale forming level 118 to enter the lower end of outer production pipe, shell or casing 104 where recycling oil is also introduced at discharge outlet 106 of oil injection pipe 105. The mixture of oil and geothermal fluid flows upward through annular space 107, contacting only fluorocarbon coated surfaces to leave at outlet 109 through a fluorocarbon resin lined conduit 108 to enter heat extraction apparatus 111 at 110. Details of this are not shown as FIG. 1 shows one method of extracting such heat. The cooled geothermal fluids leave heat extractor 111 at 116 to be completely cleansed of oil (not shown) to any disposal destination such as desalination plant or injection through a well back to a geothermal reservoir (not shown as being suggested to those skilled in the art). The oil is removed in the heat extractor, leaving at 112 through conduit to oil pump 114, and returned through fluorocarbon resin lined conduit 115 to the top end of conduit 105 at the producing well, just above ground level 117. Details of the well entry are not shown as they are familiar to those skilled in the art. Should the fluorocarbon resin coating in the outer pipe, shell or casing 104 or on and in inner pipe 105 require redoing due to abrasion or other causes, both may be readily removed for such recoating.

SUMMARY OF THE INVENTION

The invention has been described in detail for the purpose of illustration but it will be obvious to those skilled in the art that numerous modification and variations may be resorted to without departing from the spirit of the invention in its broadest aspects.

Thus while the method or process is herein described primarily in reference to the cooling of hot fluids, such as geothermal brines, containing precipitable solids by heat exchange with a cooling fluid, the apparatus employed is applicable without material modification to heat exchange operations generally between two fluids, one or both of which contain precipitatable solids, which under conventional practice would adhere to the contacted surfaces of the heat interchange apparatus. This undesirable effect is prevented according to my invention by the use of contacting surfaces which are both preferentially oil wettable and also substantially zero water adsorbent, it being understood that the contacting surfaces are constantly wetted with oil or like material which is immiscible with the fluid being treated and which may be subsequently separated from such fluid. As previously pointed out, materials which are substantially zero water adsorbent are 1) fluorocarbon polymers such FEP and 2) parylene. FEP is preferred since it is heat bondable and has been found to form a more permanent coating upon metal surfaces than parylene, and in the case of cooling hot aqueous materials such as geothermal brines, a finely divided FEP powder is found to be preferable to continous pliable film.

In the case of very hot fluid, such as geothermal brines, a large amount of heat is removed from the brine by the heat exchange process and such heat may be commercially used, as for example, in the production of compressed fluid or driving turbines in the production of electricity or for use in chemical processes wherein heating is a requisite, and for other purposes. Also the precipitated solids and fluids from which the solids have been removed find commercial uses depending on the particular composition of such solids and fluids. Thus various commercially useful salts may be derived from geothermal and other brines, and in the case of aqueous fluids, the water from which the minerals have been separated may be used for irrigation and other purposes including drinking water or may be returned to the well to maintain the liquid level and underground pressure.

What is claimed is:

1. Heat exchange apparatus for treatment of aqueous fluids containing dissolved or dispersed precipitable solids or mineral salts, designed to prevent adherence of the precipitated solids to fluid contacted surface of said apparatus, said apparatus comprising 1) an outer tube, shell or casing, and 2) an inner heat exchange tube extending into said casing, both said casing and said inner tube having fluid contacted surfaces which are a) preferentially oil wettable, and b) substantially zero water adsorbent, 3) means for continuously supplying oil to the preferentially oil wettable contacted surfaces and means for passing said aqueous fluid through said shell in heat exchange relation to said inner tube, wherein the substantially zero water adsorbent surface is a fluorocarbon polymer.

2. The invention as defined in claim 1 wherein the fluorocarbon polymer is hexafluoropropylenetetrafluoroethylene.

3. The invention as defined in claim 1 wherein the fluorocarbon polymer is FEP.

4. Heat exchange apparatus for treatment of aqeuous fluids containing dissolved or dispersed precipitable solids or mineral salts, designed to prevent adherence of the precipitated solids to fluid contacted surface of said apparatus, said apparatus comprising 1) an outer tube, shell or casing, and 2) an inner heat exchange tube extending into said casing, both said casing and said inner tube having fluid contacted surfaces which are a) preferentially oil wettable, and b) substantially zero water adsorbent, 3) means for continuously supplying oil to the preferentially oil wettable contacted surfaces and means for passing said aqueous fluid through said shell in heat exchange relation to said inner tube, wherein the substantially zero water adsorbent material is parylene.

5. Heat exchange apparatus for treatment of aqueous fluids containing dissolved or dispersed precipitable solids or mineral salts, designed to prevent adherence of the precipitated solids to fluid contacted surface of said apparatus, said apparatus comprising 1) an outer tube, shell casing, and 2) an inner heat exchange tube extending into said casing, both said casing and said inner tube having fluid contacted surfaces which are a) preferentially oil wettable, and b) substantially zero water adsorbent, 3) means for continously supplying oil to the preferentially oil wettable contacted surfaces and means for passing said aqueous fluid through said shell in heat exchange relation to said inner tube, wherein the substantially zero water adsorbent surface is a para-xylylene vapor deposited polymer.

6. The invention as defined in claim 7 wherein the FEP particles are applied as a distilled water dispersion prior to heating and bonded to the metal surface.

7. The invention as defined in claim 3 wherein the FEP is applied as a finely divided particle coating prior to heating and bonded to a metal base to provide a non-continuous porous fluorocarbon polymer as a finished coating.

8. The invention as defined in claim 3 wherein the FEP particles are applied as a sprayed-on dry powder prior to heating and bonded to the metal surface.

* * * * *